(12) United States Patent
Young

(10) Patent No.: US 8,686,268 B1
(45) Date of Patent: Apr. 1, 2014

(54) SYSTEM OF ASSOCIATING SHEET MUSIC NOTATION WITH KEYBOARD KEYS AND SIGHT READING

(71) Applicant: Natalie Young, Washington, DC (US)

(72) Inventor: Natalie Young, Washington, DC (US)

( * ) Notice: Subject to any disclaimer, the term of this patent is extended or adjusted under 35 U.S.C. 154(b) by 0 days.

(21) Appl. No.: 13/803,971

(22) Filed: Mar. 14, 2013

Related U.S. Application Data

(60) Provisional application No. 61/685,365, filed on Mar. 16, 2012.

(51) Int. Cl.
   *G09B 15/02* (2006.01)

(52) U.S. Cl.
   USPC ........................................ 84/470 R

(58) Field of Classification Search
   USPC ...... 84/470 R, 471 R, 472–475, 471 SR, 476, 84/477 R, 478, 479 R, 480–482, 479 A, 84/483.1, 483.2, 484, 485 R, 485 SR
   See application file for complete search history.

(56) References Cited

U.S. PATENT DOCUMENTS

| | | | |
|---|---|---|---|
| 1,323,943 A | 12/1919 | Wilcox |
| 3,331,271 A | 7/1967 | Glenn |
| 3,845,685 A | 11/1974 | Coles |
| 4,054,079 A | 10/1977 | Sohler |
| 4,404,886 A | 9/1983 | Leonard |
| 5,404,788 A | 4/1995 | Frix |
| 5,496,179 A | 3/1996 | Hoffman |
| 5,574,238 A | 11/1996 | Mencher |
| 5,685,724 A | 11/1997 | Bubar |
| 5,775,915 A | 7/1998 | Quinn |
| 5,962,800 A | 10/1999 | Johnson |
| 6,124,540 A | 9/2000 | Lotito |
| 6,169,239 B1 | 1/2001 | Aiardo |
| 6,284,961 B1 | 9/2001 | Kimmel, Jr. |
| 6,605,767 B2 | 8/2003 | Fiks |
| 6,831,220 B2 | 12/2004 | Varme |
| 6,870,085 B2 | 3/2005 | MacCutcheon |
| 6,987,220 B2 | 1/2006 | Holcombe |
| 7,253,349 B1 | 8/2007 | Saltsman |
| 7,453,036 B1 | 11/2008 | Henkel |
| 7,739,595 B2 | 6/2010 | Salter |
| 8,049,092 B1 | 11/2011 | Vaughan |

(Continued)

FOREIGN PATENT DOCUMENTS

| WO | 90/03628 | 4/1990 |
|---|---|---|
| WO | 2005/010861 A2 | 2/2005 |
| WO | 2009/031162 A2 | 3/2009 |

*Primary Examiner* — Kimberly Lockett
(74) *Attorney, Agent, or Firm* — Berenato & White, LLC

(57) ABSTRACT

A system of associating sheet music notation with keyboard keys of a keyboard instrument and sight reading comprises a rectilinear colored strip adapted to be disposed upon the keyboard instrument. The colored strip includes first and second sets of markings corresponding to first and second octaves of the keyboard. Each of the sets includes wide markings corresponding to white keys of the keyboard and narrow markings corresponding to black keys thereof. Each of the wide markings of the first set is color-coded with a first color and each of the wide markings of the second set is color-coded with a second color different from the second color. The system further comprises a musical notation including musical notes color-coded with the same colors the first and second sets of markings on the colored rectilinear strip.

20 Claims, 7 Drawing Sheets

(56) References Cited

U.S. PATENT DOCUMENTS

| | | |
|---|---|---|
| 8,088,985 B1 | 1/2012 | Bowser |
| 2003/0167902 A1 | 9/2003 | Hiner |
| 2008/0141849 A1 | 6/2008 | Johnston |
| 2009/0064848 A1 | 3/2009 | Henkel |
| 2009/0266222 A1 | 10/2009 | Epstein |
| 2010/0005952 A1 | 1/2010 | Lamon |
| 2011/0259178 A1 | 10/2011 | Hiner |
| 2012/0135789 A1 | 5/2012 | Feidner |

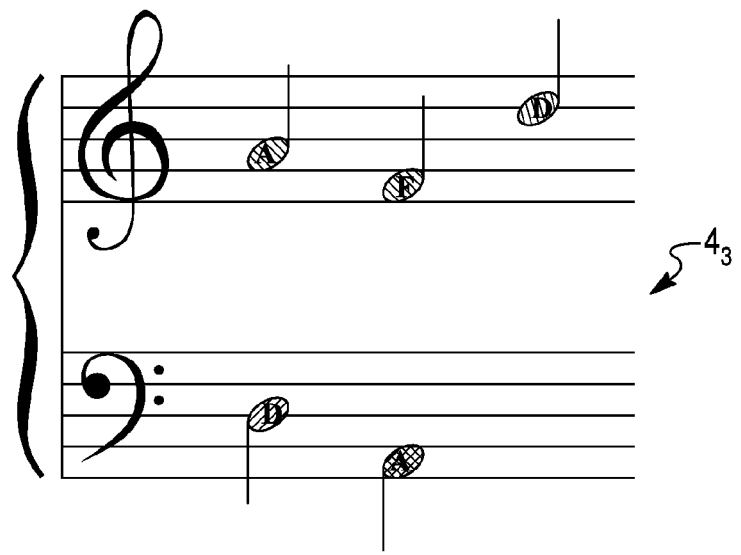

Fig. 5D

SYSTEM OF ASSOCIATING SHEET MUSIC NOTATION WITH KEYBOARD KEYS AND SIGHT READING

CROSS-REFERENCE TO RELATED APPLICATIONS

This application claims the benefit of priority of provisional application 61/685,365 filed on Mar. 16, 2012, the disclosure of which is herein incorporated by reference.

The patent or application file contains a least one drawing executed in color. Copies of this patent or patent application publication with color drawing(s) will be provided by the Office upon request and payment of the necessary fee.

BACKGROUND OF THE INVENTION

1. Field of the Invention

The present disclosure relates to learning systems for playing keyboard instruments and coordinating music sight reading therewith, and, more particularly, to a system of associating sheet music notation with keyboard keys and sight reading, whereby a player can be self-taught or be more easily tutored to become reasonably adept at playing a keyboard instrument.

2. Description of the Related Art

Generally speaking, musical keyboard instruments are principal components of a variety of instruments such as pianos, organs, keyboard style synthesizers, and the like. With such instruments the player's fingers strike or press keys which directly correspond through a fairly complex centuries-old coding scheme with discrete musical notes prominently displayed adjacent to an instrument keyboard.

Musical notations, for example, may be in the form of music book pages, sheet music, musical score strips in paper or digital format, or visually projected against a screen or backdrop. A student player is tasked with viewing each note to be played, interpreting how the depicted image is to be associated with the keyboard, then responsively depress fingers in numbers and directions to depress one or more corresponding keys. Each key essentially embodies a lever implement causing piano's internal mechanism or electronic keyboard program to "sound" the proper note.

The act of pressing a key to induce a responsive sound can be carried out by a mere toddler with zero training. Beyond that, learning which musical note is associated with which key (or vice versa) is measurable more complex. Add to that the training required to associate manual manipulation of piano keys responsive to visual interpretation of musical encryption, in a continuous progression, and involving multiple fingers and keys, is the cumulative magic of talented musicians. This challenge is not new to would-be musicians.

Since the invention of the piano keyboard by Bartolomeo Cristofori in 1700 and Ludovico Giustini's introduction of published piano music barely three decades later, people around the world have struggled with varying success to conquer the inherent challenge of converting the written code to melodious sounds. Some students, perhaps with natural talent or instinct, pick up quickly in mastering the musical keyboard. Others require many years of dedication to a training regimen.

The prospects for success of those in the latter group are considerably enhanced through the able assistance of those who simply love to teach and are good at it. Still others owe their success to the thoughtful works of inventors who followed Cristofori and Giustini across the centuries, constantly applying their critical thinking to life's daily challenges, not the least of which are training tools for keyboard mastery.

Thus, conventional methods for learning to play musical keyboard instruments are susceptible to improvements. With this in mind, a need exists to develop a system and/or method of learning to play musical keyboard instruments that advances the art.

SUMMARY OF THE INVENTION

The present invention is directed to a system of associating sheet music notation with keyboard keys of a keyboard instrument and sight reading. The keyboard instrument includes a keyboard having at least first and second octaves and twelve depressible white and black keys in each of the first and second octaves. The system comprises a rectilinear colored strip adapted to be disposed upon the keyboard instrument adjacent to the keyboard. The rectilinear colored strip has a color-coded indicia disposed on an upper surface thereof and having a direct relationship to each of the octaves and each of the depressible keys of the keyboard. The color-coded indicia includes first and second sets of markings with twelve markings in each of the first and second sets corresponding to and complementary to the first and second octaves and the twelve depressible keys in each of the first and second octaves of the keyboard. Each of the first and second sets of markings includes seven wide markings corresponding to and complementary to the white keys of the keyboard and five narrow markings corresponding to and complementary to the black keys of the keyboard. Each of the wide markings of the first set is color-coded with a first color and each of the wide markings of the second set is color-coded with a second color such that the first color is different from the second color. The system further comprises a musical notation including musical notes corresponding to at least one of the first and second octaves such that at least one of the musical notes of the musical notation is color-coded with the same color as one of the first and second sets of markings on the colored rectilinear strip in direct correlation to the indicia.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 5C is a plan view of a sample sheet music notation of still another embodiment in accordance with the present invention; and FIG. 5D is a plan view of a well known music sheet modified in accordance with the present invention.

DESCRIPTION OF EXEMPLARY EMBODIMENTS

Figure 1:
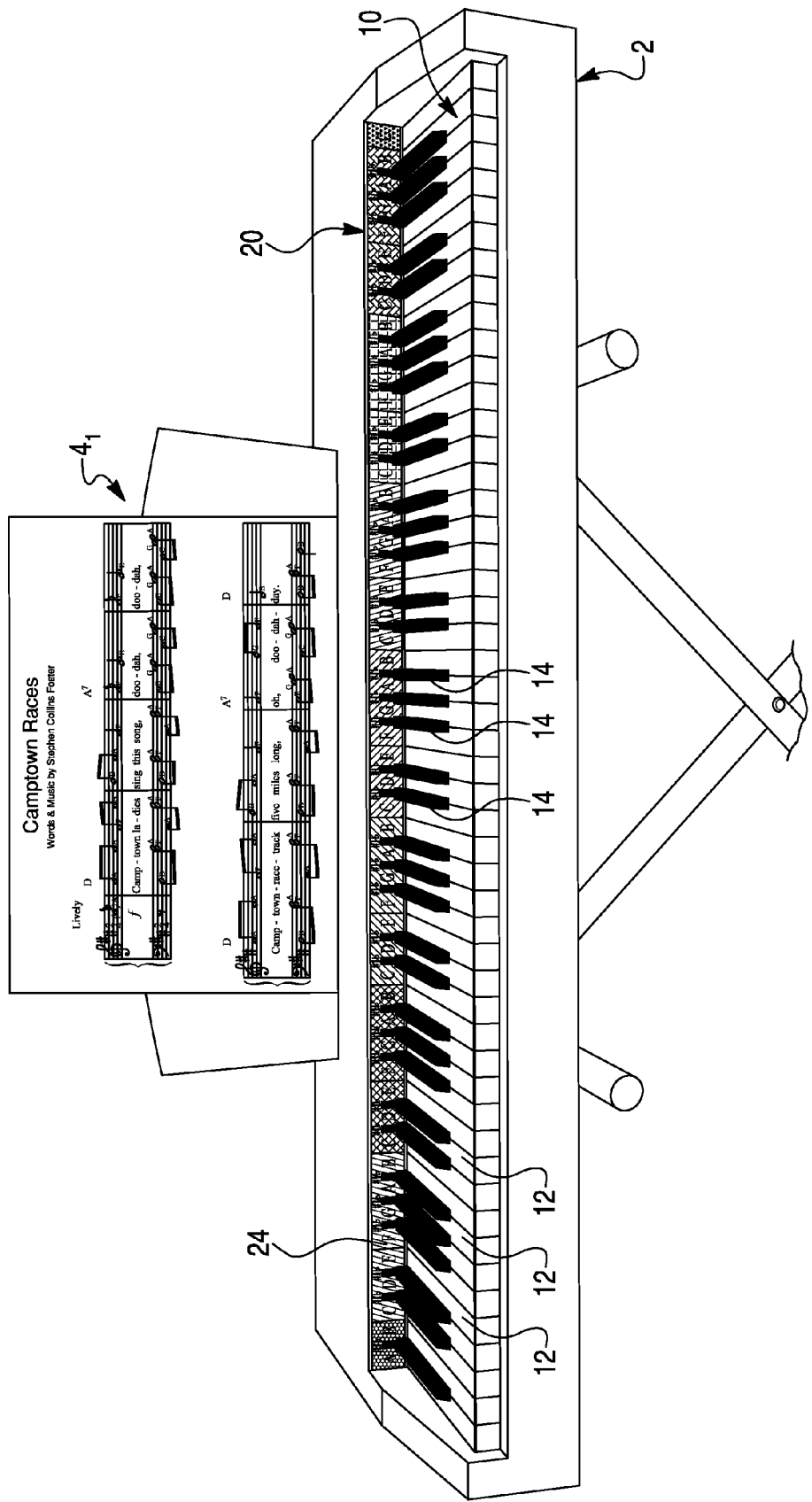
FIG. 1 is a front top perspective view of a musical keyboard instrument with a musical keyboard displaying a portable rectilinear colored strip according to an exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" as used in the claims means "at least one" and the word "two" as used in the claims means "at least two".

The present invention is related to a system and method of associating sheet music notation with a musical keyboard 10 of a musical keyboard instrument 2 shown in FIG. 1. The musical keyboard 10 of the keyboard instrument 2 may be a piano keyboard, an electronic keyboard (as shown in FIG. 1), or the like. For simplicity of discussion only, the piano keyboard will be described. A keyboard player (referred to herein also as user or student) can easily play a treble clef and bass clef music notation 4 (illustrated in FIG. 2) on the piano using (i.e., reading from) any music sheet incorporating the elements to be described in detail herein below and/or the equivalents thereof.

Figure 3:
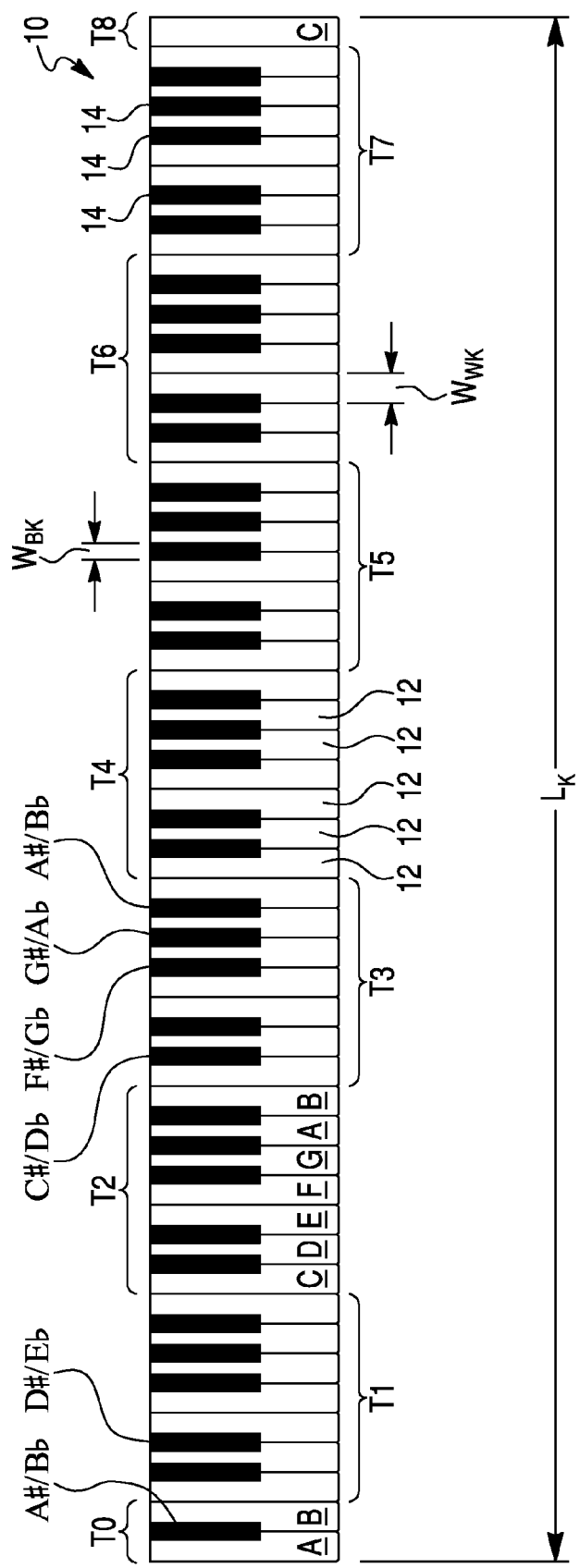
FIG. 3 is a top plan view of the musical keyboard of the keyboard instrument showing octaves and keys.

The musical keyboard 10, illustrated in detail in FIG. 3, comprises a plurality (or set) of adjacent depressible keys 12, 14 on a keyboard instrument, particularly a piano. The musical keyboard 10 typically includes the keys 12, 14 for playing twelve notes of the Western musical scale, with a combination of larger, longer keys 12 and smaller, shorter keys 14 that repeats at the interval of an octave. Depressing the key 12, 14 on the keyboard 10 causes the instrument to produce sounds, either by mechanically striking a string or tine (piano, electric piano, clavichord), or by plucking a string (harpsichord), causing air to flow through a pipe (organ), strike a bell (carillon), or a (piano) hammer hitting the strings (strings then vibrate to produce sound/note). Since the most commonly encountered keyboard instrument is the piano, the keyboard layout is often referred to as the "piano keyboard". The longer keys 12 are white colored and called the naturals or white keys, while the shorter keys 14 are black colored and called the accidentals or black keys. The shorter black keys 14 are raised above the longer white keys 12.

The twelve notes of the Western musical scale are laid out with the lowest note on the left. The longer white keys 12 jut forward for producing the seven "natural" notes of the C major scale commonly designated by musical symbols C, D, E, F, G, A, B). The shorter black keys 14 are provided for producing the remaining five notes, which are not part of the C major scale, commonly designated by musical symbols C♯/D♭, D♯/E♭, F♯/G♭, G♯/A♭, A♯/B♭ (sharp/flat). The pattern of the twelve keys 12, 14 of the musical keyboard 10 repeats at the interval of the octave. It should be understood that in music, the term note has two primary meanings:

1. A sign used in the musical notation to represent the relative duration and pitch of a sound; and
2. A pitched sound itself.

The plurality of white and black depressible keys 12, 14 of the conventional musical keyboard 10 are arranged along the laterally arrayed keyboard 10 and grouped into seven main octaves T1-T7 and two minor octaves T0, T8. As noted above, each of the seven main octaves T1-T7 comprises twelve (12) depressible keys (seven white keys 12 and five black keys 14) along the keyboard 10, reproducing upon striking thereon twelve (12) repetitive musical notes, namely: C, C♯/D♭, D, D♯/E♭, E, F, F♯/G♭, G, G♯/A♭, A, A♯/B♭ and B. The minor octave T0 includes three (3) keys: two white keys 12 (musical notes A and B) and one black key 14 (musical note A♯/B♭). The minor octave T8 includes one (1) key: the white key 12 (representing the musical note C). It should be noted that some keyboards, especially electronic keyboard, may have less than nine total octaves (T0-T8).

Therefore, the keys of the first octave T1 can be marked $C^1$-$B^1$, the keys of the second octave T2 can be marked $C^2$-$B^2$, ..., the keys of the seventh octave T7 can be marked $C^7$-$B^7$, the keys of the minor octave T0 can be marked $A^0$-$B^0$, and the keys of the minor octave T8 can be marked $C^8$, as illustrated in FIG. 3. Again, the twelve notes C-B repeat in series along the keyboard 10, from octave T0 to octave T8 as shown in FIG. 3.

Figure 4A:
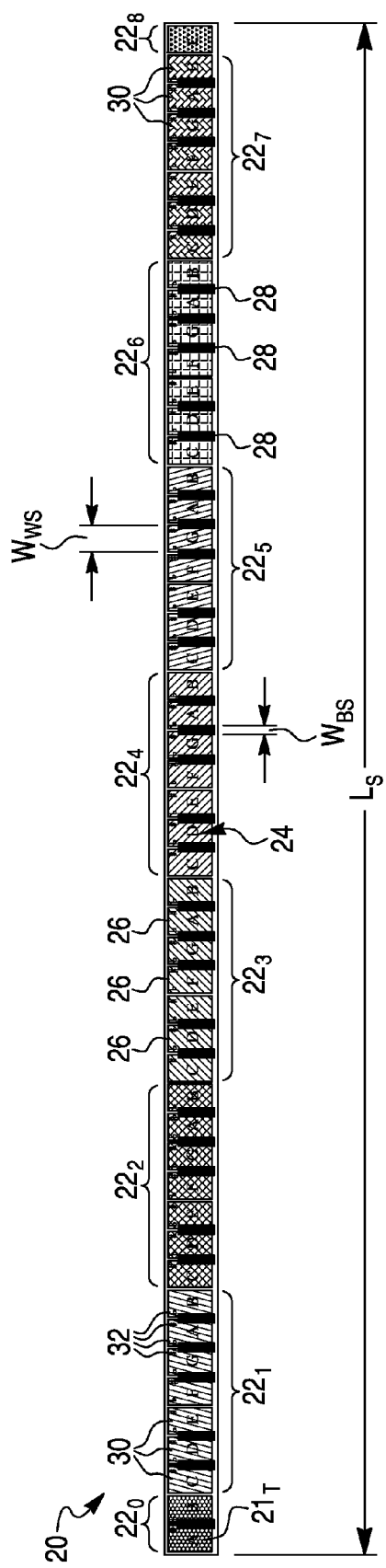
FIG. 4A is a top elevation view of the portable rectilinear colored strip according to the exemplary embodiment of the present invention, reflecting the keys and octaves of the musical keyboard in an exemplary color scheme.
Figure 4B:
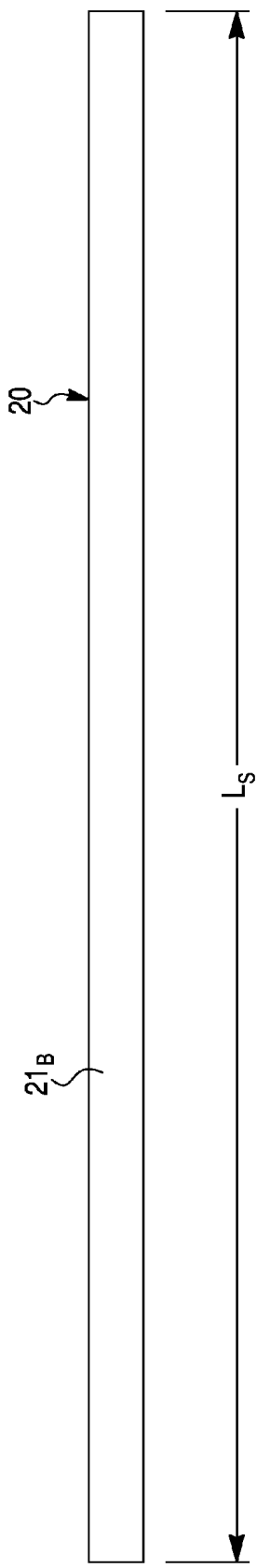
FIG. 4B is a bottom elevation view of the portable rectilinear colored strip according to the exemplary embodiment of the present invention.

The system according to the exemplary embodiment of the present invention comprises a portable, colored rectilinear strip 20 having an upper surface $20_T$ and a lower surface $20_B$, as shown in FIGS. 4A and 4B. The lower surface $20_B$ of the rectilinear colored strip 20 is adapted to be placed upon the keyboard instrument 2 adjacent to the musical keyboard 10 as shown in FIG. 1.

The colored rectilinear strip 20 is provided with an indicia 24 (best shown in FIG. 4A) disposed on the upper surface $20_T$ thereof so that the indicia 24 is viewable to a keyboard player, i.e. is within an eyesight of the keyboard player, as illustrated in FIG. 1. In other words, the colored rectilinear strip 20 can be placed in easy view of the keyboard player. For example, as shown in FIG. 1, the rectilinear strip 20 may be placed in a slot typically located immediately in front of the keyboard 10 adjacent a rearward edge of the keyboard keys 12, 14. Of course, the rectilinear strip 20 may be conveniently located elsewhere, yet always within eyesight of the keyboard player, i.e., viewable to the keyboard player.

The rectilinear strip 20 is distinguished by a series of specific colors with respect to each octave on a sheet of music (FIG. 5) as will be explained. Colors representatively depicted herein (both in the rectilinear strip 20 and the sheet music) are in no way to be considered or contemplated limiting the scope of the present invention to be claimed, but are instead strictly exemplary. The colored rectilinear strip 20 is visually associated with the specific sheet music.

Specifically, the indicia 24 includes a plurality of markings corresponding to and complementary to the nine octaves (T0-T8) and the depressible keys 12, 14 in each of the octaves (T0-T8). More specifically, the indicia 24 includes a plurality of wide markings 26 corresponding to and complementary to the white keys 12 of the musical keyboard 10, and a plurality of narrow markings 28 corresponding to and complementary to the black keys 14 of the musical keyboard 10.

In other words, the indicia 24 comprises the wide and narrow markings 26 and 28 grouped into seven main sets $22_1$-$22_7$ of the markings 26, 28 corresponding to and representing the seven main octaves T1-T7, and two minor sets $22_0$ and $22_8$ of the markings 26, 28 corresponding to and representing the two minor octaves T0, T8. Each of the seven main sets $22_1$-$22_7$ of the markings 26, 28 comprises twelve (12) markings (seven wide markings 26 and five narrow markings 28) along the rectilinear strip 20 corresponding to and representing the twelve (12) keys of the main octaves T1-T7 of the musical keyboard 10, namely: C, C♯/D♭, D, D♯/E♭, E, F, F♯/G♭, G, G♯/A♭, A, A♯/B♭ and B. One of the minor sets $22_0$ of the markings 26, 28 comprises three (3) markings (two wide markings 26 and one narrow marking 28) along the rectilinear strip 20 corresponding to and representing the keys of the minor octave T0 of the musical keyboard 10, namely: musical notes A, B and A♯/B♭, respectively. Another of the minor sets $22_8$ of the markings 26, 28 comprises one (1) wide marking 26 along the rectilinear strip 20 corresponding to and representing the key of the minor octave T8 of the musical keyboard 10, namely: the musical note C.

Generally, in terms of structural scale, the rectilinear strip 20 according to the exemplary embodiment of the present invention is coextensive in length with a keyboard span of the full-size (or smaller) musical keyboard 10. In other words, in the exemplary embodiment of the present invention, a length $L_S$ of the rectilinear strip 20 (shown in FIGS. 4A and 4B) matches (is substantially equal to) a length $L_K$ of the associated keyboard 10 (shown in FIG. 3), typically about forty-eight inches, but may be supplied in shorter (fewer octave) lengths for training in limited ranges. Moreover, the indicia 24 of the rectilinear strip 20 have a direct relationship to each of the octaves T0-T8 of the musical keyboard 10 and each of the depressible keys 12, 14 thereof. Specifically, the length $L_S$ of the rectilinear strip 20 (shown in FIGS. 4A and 4B) is substantially equal (i.e., corresponds) to the length $L_K$ of the musical keyboard 10 (shown in FIG. 3). Moreover, a width $W_{WS}$ of each of the wide markings 26 of the rectilinear strip 20 (shown in FIG. 4A) is substantially equal (i.e., corresponds) to a width $W_{WK}$ of each of the white keys 12 of the musical keyboard 10 (shown in FIG. 3), while a width $W_{BS}$ of each of the narrow markings 28 of the rectilinear strip 20 (shown in FIG. 4A) is substantially equal (i.e., corresponds) to a width $W_{BK}$ of each of the black keys 14 of the musical keyboard 10 (shown in FIG. 3). In other words, the indicia 24 of the rectilinear strip 20 has a direct relationship to each of the octaves T0-T8 of the musical keyboard 10 and each of the depressible keys 12, 14 thereof.

Thus, when the rectilinear strip 20 is placed upon the keyboard instrument 2 adjacent to the musical keyboard 10, for example, as shown in FIG. 1, in a slot typically located immediately in front of the keyboard 10 adjacent a rearward edge of the keyboard keys 12, 14, the wide and narrow markings 26 and 28 of the indicia 24 of the rectilinear strip 20 match, i.e. have a direct relationship to, the white and black keys 12 and 14 of the musical keyboard 10 of the keyboard instrument 2. Specifically, as illustrated in FIG. 1, the markings 26 and 28 of the sets $22_0$-$22_8$ of the indicia 24 of the rectilinear strip 20 substantially match the corresponding keys 12 and 14 of the octaves T0-T8 of the musical keyboard 10. Furthermore, each of said markings corresponding to said white keys of said first octave being color-coded with a first color and each of said markings corresponding to said white keys of said second octave being color-coded with a second color, said first color being different from said second color.

Further according to the present invention, the wide markings 26 of each of the sets $22_0$-$22_8$ of the indicia 24 of the rectilinear strip 20 (corresponding to the octaves T0-T8 of the musical keyboard 10) are color-coded with the same color. Specifically, one of nine different colors is assigned exclusively to each of the sets $22_0$-$22_8$ of the indicia 24. In other words, each of the wide markings 26 the set $22_1$ of the indicia 24 of the rectilinear strip 20 is color-coded with a first color, each of the wide markings 26 the set $22_2$ of the indicia 24 is color-coded with a second color, etc. Moreover, the colors of each of the sets $22_0$-$22_8$ of the indicia 24 of the rectilinear strip 20 are different from each other. In the exemplary embodiment of the present invention, each of the wide markings 26 of the set $22_0$ is color-coded in pink, each of the wide markings 26 of the set $22_1$ is color-coded in orange, the wide markings 26 of the set $22_2$ are color-coded in yellow, each of the wide markings 26 of the set $22_3$ is color-coded in red, each of the wide markings 26 of the set $22_4$ is color-coded in green, each of the wide markings 26 of the set $22_5$ is color-coded in blue, each of the wide markings 26 of the set $22_6$ is color-coded in brown, each of the wide markings 26 of the set $22_7$ is color-coded in purple, and the wide marking 26 of the set $22_8$ is color-coded in turquoise color. It will be appreciated that any different color combination is within the scope of the present invention. By contrast, the narrow markings 28 of the sets $22_0$-$22_8$ of the indicia 24 of the rectilinear strip 20 are colored with a black color.

Thus, the rectilinear strip 20 carries or displays a differentially colored, non-repetitive sequence of the wide markings 26. As noted above, the colored rectilinear strip 20 is adapted to be snuggly placed (for example) directly behind the keys 12, 14 of the musical keyboard 10 of the keyboard instrument 2 to guide the student when playing the associated sheet music shown in FIG. 1.

Figure 2:
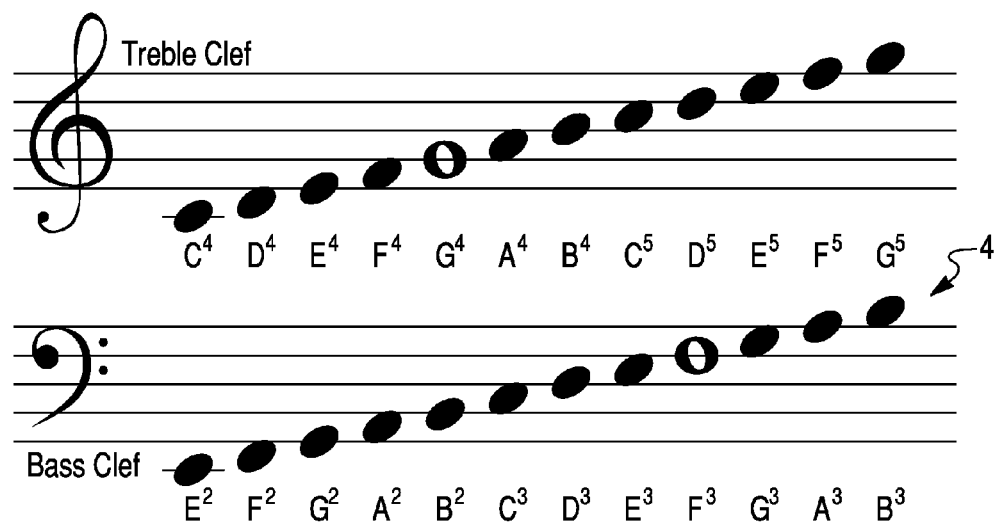
FIG. 2 is a schematic view of a musical notation representing a Bass and Treble Clef, along with the 7 main notes (A-G) repeating over various octaves.

Further according to the exemplary embodiment of the present invention, one or more, but preferably each of the colored wide markings 26 of at least one of the sets $22_o$-$22_8$ of the indicia 24 of the rectilinear strip 20 is identified (in addition to color) by a letter-coded musical symbol (C, D, E, F, G, A or B) corresponding to the equivalent white key 12 of the musical keyboard 10 as illustrated in FIGS. 2 and 3. In other words, each of the colored wide markings 26 of at least one of the sets $22_0$-$22_8$ on the colored rectilinear strip 20 is marked with a character 30 in the form of one of the musical symbols (C, D, E, F, G, A or B) representing one of the plurality of the depressible white keys 12. Moreover, each of the black narrow markings 28 of at least one of the sets $22_o$-$22_8$ of the indicia 24 of the rectilinear strip 20 is identified (in addition to black color) by a character 32 in the form of a musical symbol ♯/♭ (sharp/flat).

The rectilinear strip 20 is made of flexible (for folded or rolled storage) or rigid yet durable material, such as paper, cardboard, plastic, etc. The rectilinear strip 20 is easily storable and portable. The rectilinear strip 20 can be provided and dispensed from a rolled state and temporarily applied to the keyboard instrument 2 by any suitable fastener tape or hook/loop fastener elements. Alternatively, the rectilinear strip 20 can stay in place with no fasteners at all. The rectilinear strip 20 can exist in assembled discrete segments or more conveniently presented as a unitary display.

It should be wide enough to be easily visible by the keyboard player and a teacher/instructor, yet can be relatively narrow enough as not to be easily viewed by others. Alternatively, there can be advantages to having a wider chart display where other viewers are involved or other conditions require such. In the exemplary embodiment of the present invention, the width (top to bottom edge) of the rectilinear strip 20 can be in the range of about one inch, but may be considerably wider if enhanced visibility is required.

The system according to the exemplary embodiment of the present invention further comprises at least one musical notation $4_1$-$4_3$ (shown in detail in FIGS. 5A-5D) including musical notes such that one or more of the musical notes of the musical notation $4_1$-$4_3$ is color-coded with the same color as one of the sets $22_0$-$22_8$ of the indicia 24 of the rectilinear strip 20 corresponding to one of the octave T0-T8 of the musical keyboard 10 of the keyboard instrument 2. In other words, one or more of the musical notes of the musical notation $4_1$-$4_3$ according to the exemplary embodiment of the present invention are color-coded in direct correlation to the indicia 24 of the colored rectilinear strip 20. Specifically, the sheet or bounded music pages of the musical notation $4_1$-$4_3$ displaying notes in well-known array are modified so as to be distinguished by color (or other suitable designations). The color-coding of the musical notation $4_1$-$4_3$ may take place during, or post-publication. More specifically, and merely for example, see FIGS. 5A-5D wherein variations of musical score representations are depicted with color encoding so the user can quickly determine the proper octave in which the notes are to be played.

In the exemplary embodiment of the present invention, the musical notes of the musical notation $4_1$-$4_3$ corresponding to the minor octave T0 are color-coded in pink, the musical notes corresponding to the first octave T1 are color-coded in orange, the musical notes corresponding to the second octave T2 are color-coded in yellow, the musical notes corresponding to the third octave T3 are color-coded in red, the musical notes corresponding to the fourth octave T4 are color-coded in green, the musical notes corresponding to the fifth octave T5 are color-coded in blue, the musical notes corresponding to the sixth octave T6 are color-coded in brown, the musical notes corresponding to the seventh octave T7 are color-coded in purple, and the musical note corresponding to the minor octave T8 are is color-coded in turquoise.

Figure 5A:
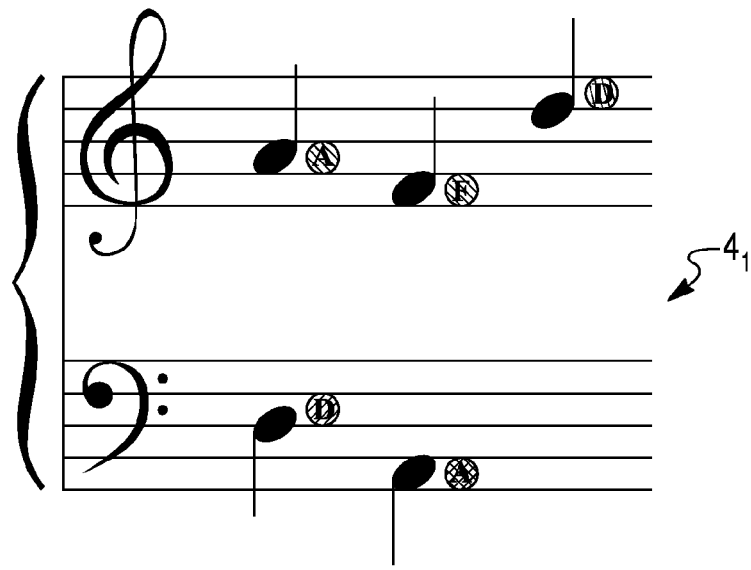
FIG. 5A is a plan view of a sample sheet music notation in accordance with the exemplary embodiment of the present invention.

In the embodiment of FIG. 5A, the musical notes of a musical notation $4_1$ are color-coded by providing an enclosed (in a square, rectangle or circle) written text character (letter-coded marking) identifying one of the musical notes (C, D, E, F, G, A or B), which are placed or inscribed directly adjacent to their associated noteheads in the musical notation $4_1$ and colored to connote the intended octave T0-T8 of the musical keyboard 10 of the keyboard instrument 2. This notation scheme affords easy interpretation without confusion with notehead variations such as full-black quarter-notes, hollow oval whole notes, and open half-note noteheads. The color and text notations can be combined or separate in a format co-printed with the music sheet/book; alternatively, these novel notations may be subsequently applied as adhesive tabs from a packaged array as part of a keyboard tutoring kit.

Figure 5B:
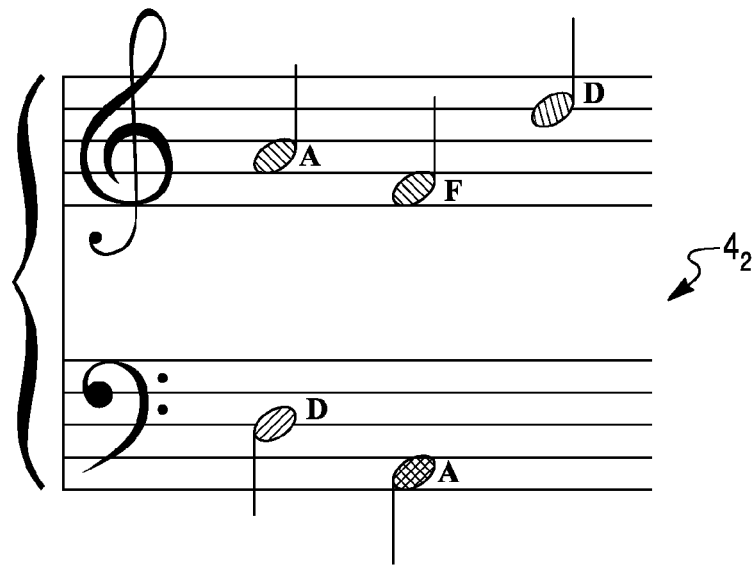
FIG. 5B is a plan view of the sample sheet music notation in accordance with another embodiment of the present invention.

In the embodiment of FIG. 5B, a musical notation $4_2$ is shown, where the text notations (C, D, E, F, G, A or B) are placed next to the notehead, while the notehead itself is given a color to connote the intended octave T0-T8 of the musical keyboard 10 of the keyboard instrument 2. This could be accomplished while still distinguishing varied noteheads such as whole, quarter, and/or half notes.

The embodiment of FIG. 5C illustrates a musical notation $4_3$ with the written text note (C, D, E, F, G, A or B) placed within boundaries of the notehead, while the color of the intended octave is also represented inside the notehead.

Figure 5D:
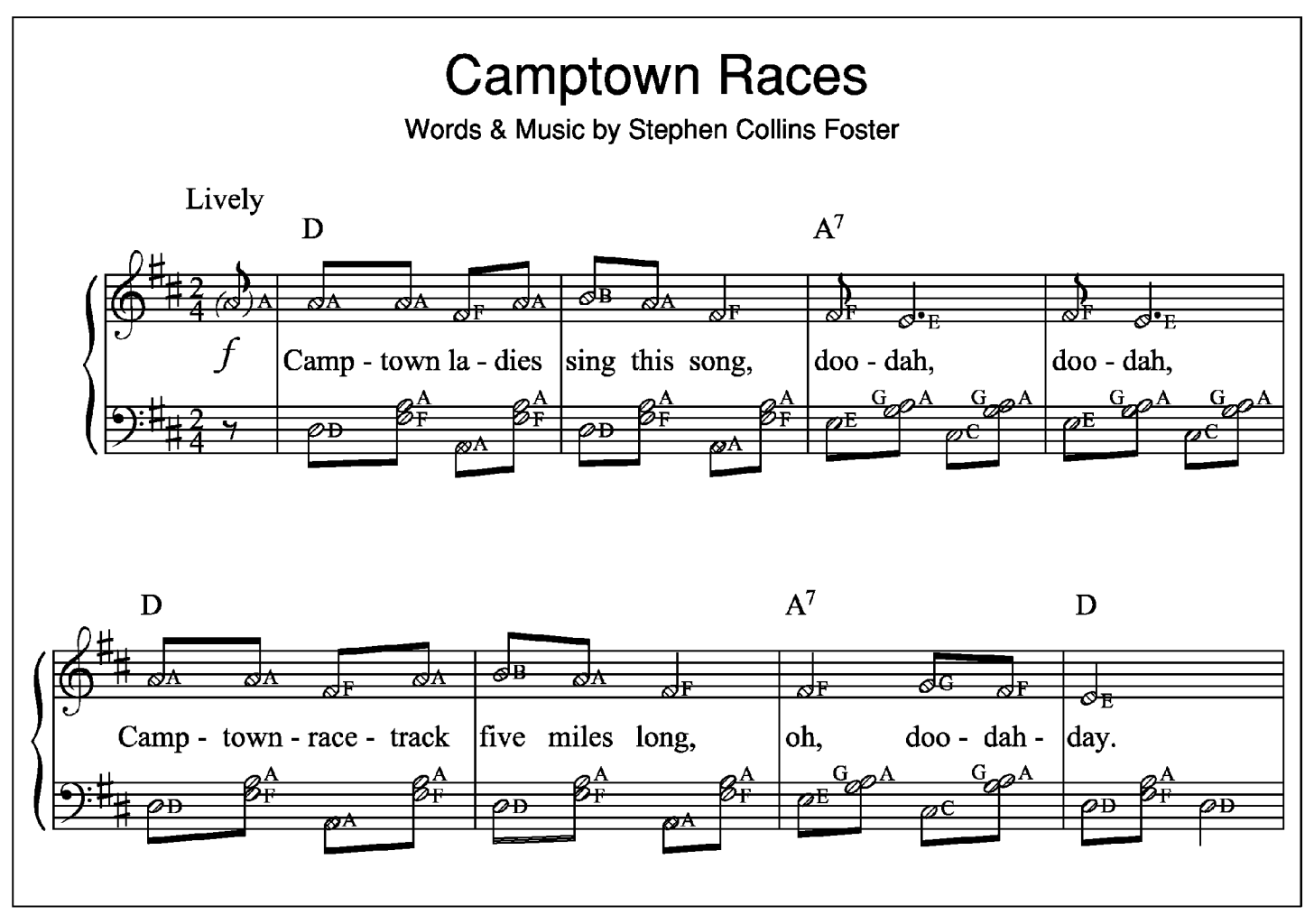

FIG. 5d depicts Stephen Foster's enduring score entitled Camptown Races illustrated here as incorporating elements of the exemplary embodiment of the present disclosure. On the displayed sheet of the musical notation 4 the written text (alpha character) musical "note" (A, B, C, D, E, F and G) is placed next to the graphic note depiction. In addition, the text "note" is depicted in the corresponding color of the associated octave. This example shows how fairly complex music can be encoded in the manner introduced herein, regardless of notehead types or stem interconnections, etc.

The color coding scheme described and illustrated in the exemplary embodiments of the present invention enables the piano (or other keyboarded instrument) student to quickly determine which octave that a particular musical "note" should be manually addressed on the keyboard 10 as guided by the above-described colored rectilinear strip 20, and associated with an encoded score 4. This particularly addresses the inherent confusion introduced by the clefs in a simplified manner by instantly identifying the octave in which the musical note is to be played.

The system according to the present invention relates to both treble and bass clef of the musical notation, and is applicable to any sheet music suitably and simply modified.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A system of associating sheet music notation with keyboard keys of a keyboard instrument and sight reading, the keyboard instrument including a keyboard having first and second octaves and twelve depressible white and black keys in each of said first and second octaves, said system comprising:

a portable rectilinear colored strip having an upper surface and a lower surface;

said lower surface of said rectilinear colored strip adapted to be disposed upon said keyboard instrument adjacent to said keyboard;

said colored rectilinear strip having a color-coded indicia disposed on said upper surface thereof, said indicia having a direct relationship to each of said octaves and each of said depressible keys;

said indicia including first and second sets of markings with twelve markings in each of said first and second sets corresponding to and complementary to said first and second octaves and said twelve depressible keys in each of said first and second octaves;

each of said first and second sets of markings including seven wide markings corresponding to and complementary to said white keys of the keyboard and five narrow markings corresponding to and complementary to said black keys of the keyboard;

each of said wide markings of said first set being color-coded with a first color and each of said wide markings of said second set being color-coded with a second color, said first color being different from said second color; and a musical notation including musical notes corresponding to at least one of the first and second octaves such that at least one of said musical notes of said musical notation being color-coded with the same color as one of said first and second sets of markings on said colored rectilinear strip in direct correlation to said indicia.

2. The system as defined in claim 1, wherein at least one of said color-coded wide markings of at least one of said first and second sets of markings includes a letter-coded musical symbol representing the corresponding white key of the keyboard.

3. The system as defined in claim 2, wherein each of said color-coded wide markings of each of said first and second sets of markings includes said letter-coded musical symbol representing the corresponding white key of the keyboard.

4. The system as defined in claim 1, wherein each of said narrow markings of said first and second sets of markings corresponding to said black keys of said first and second octaves being color-coded with a black color.

5. The system as defined in claim 4, wherein at least one of said black narrow markings of at least one of said first and second sets of markings is identified by a character in the form of a musical symbol ♯/♭ (sharp/flat).

6. The system as defined in claim 5, wherein each of said black narrow markings of said first and second sets of markings is identified by a character in the form of said musical symbol ♯/♭ (sharp/flat).

7. The system as defined in claim 1, wherein a width of each of said wide markings of said rectilinear strip is substantially equal to a width of each of the white keys of the musical keyboard; and wherein a width of each of said narrow markings of said rectilinear strip is substantially equal to a width of each of the black keys of the keyboard.

8. The system as defined in claim 1, wherein said indicia includes seven main sets of markings with twelve markings in each of said main sets corresponding to and complementary to seven main octaves of the keyboard and said twelve depressible keys in each of said seven main octaves, and two minor sets of markings corresponding to and complementary to two minor octaves of the keyboard; wherein one of said minor sets includes two color-coded wide markings and one black narrow marking; and wherein another of said minor sets includes one color-coded wide marking.

9. The system as defined in claim 8, wherein a length of said rectilinear strip is substantially equal to a length of the keyboard.

10. The system as defined in claim 1, wherein each of said musical notes of said musical notation is color-coded with the same color as the corresponding set of markings on said colored rectilinear strip.

11. A system for playing a keyboard instrument, said system comprising:

said keyboard instrument including a keyboard having first and second octaves and twelve depressible white and black keys in each of said first and second octaves;

a portable rectilinear colored strip having an upper surface and a lower surface;

said lower surface of said rectilinear colored strip adapted to be disposed upon said keyboard instrument adjacent to said keyboard;

said colored rectilinear strip having a color-coded indicia disposed on said upper surface thereof, said indicia having a direct relationship to each of said octaves and each of said depressible keys;

said indicia including first and second sets of markings with twelve markings in each of said first and second sets corresponding to and complementary to said first and second octaves and said twelve depressible keys in each of said first and second octaves;

each of said first and second sets of markings including seven wide markings corresponding to and complementary to said white keys of said keyboard and five narrow markings corresponding to and complementary to said black keys of said keyboard;

each of said wide markings of said first set being color-coded with a first color and each of said wide markings of said second set being color-coded with a second color, said first color being different from said second color; and a musical notation including musical notes corresponding to at least one of the first and second octaves such that at least one of said musical notes of said musical notation being color-coded with the same color as one of said first and second sets of markings on said colored rectilinear strip in direct correlation to said indicia.

12. The system as defined in claim 11, wherein at least one of said color-coded wide markings of at least one of said first and second sets of markings includes a letter-coded musical symbol representing the corresponding white key of said keyboard.

13. The system as defined in claim 12, wherein each of said color-coded wide markings of each of said first and second sets of markings includes said letter-coded musical symbol representing the corresponding white key of said keyboard.

14. The system as defined in claim 11, wherein each of said narrow markings of said first and second sets of markings corresponding to said black keys of said first and second octaves being color-coded with a black color.

15. The system as defined in claim 14, wherein at least one of said black narrow markings of at least one of said first and second sets of markings is identified by a character in the form of a musical symbol ♯/♭ (sharp/flat).

16. The system as defined in claim 15, wherein each of said black narrow markings of said first and second sets of markings is identified by a character in the form of said musical symbol ♯/♭ (sharp/flat).

17. The system as defined in claim 11, wherein a width of each of said wide markings of said rectilinear strip is substantially equal to a width of each of the white keys of the musical keyboard; and wherein a width of each of said narrow markings of said rectilinear strip is substantially equal to a width of each of the black keys of the musical keyboard.

18. The system as defined in claim 11, wherein said indicia includes seven main sets of markings with twelve markings in each of said main sets corresponding to and complementary to seven main octaves of the keyboard and said twelve depressible keys in each of said seven main octaves, and two minor sets of markings corresponding to and complementary to two minor octaves of the keyboard; wherein one of said minor sets includes two color-coded wide markings and one black narrow marking; and wherein another of said minor sets includes one color-coded wide marking.

19. The system as defined in claim 18, wherein a length of said rectilinear strip is substantially equal to a length of said keyboard.

20. The system as defined in claim 11, wherein each of said musical notes of said musical notation is color-coded with the same color as the corresponding set of markings on said colored rectilinear strip.

\* \* \* \* \*